United States Patent
Toake et al.

(10) Patent No.: US 10,827,734 B2
(45) Date of Patent: Nov. 10, 2020

(54) DUAL-BEARING REEL

(71) Applicant: Shimano Inc., Osaka (JP)

(72) Inventors: Youhei Toake, Osaka (JP); Shu Kusuda, Osaka (JP)

(73) Assignee: Shimano Inc., Osaka (JP)

( * ) Notice: Subject to any disclaimer, the term of this patent is extended or adjusted under 35 U.S.C. 154(b) by 20 days.

(21) Appl. No.: 16/506,550

(22) Filed: Jul. 9, 2019

(65) Prior Publication Data
US 2020/0022352 A1    Jan. 23, 2020

(30) Foreign Application Priority Data
Jul. 20, 2018 (JP) .................................. 2018-136917

(51) Int. Cl.
*A01K 97/06* (2006.01)
(52) U.S. Cl.
CPC .................................... *A01K 97/06* (2013.01)
(58) Field of Classification Search
CPC .......... A01K 89/0192; A01K 89/01121; A01K 89/01127; A01K 89/01925; A01K 89/011221; A01K 89/01928; A01K 97/06
See application file for complete search history.

(56) References Cited

U.S. PATENT DOCUMENTS

| | | | | |
|---|---|---|---|---|
| 2,578,477 A * | 12/1951 | Hurd | ................. | A01K 89/0192 43/20 |
| 4,015,361 A * | 4/1977 | O'Reilly | ................ | A01K 97/06 43/25.2 |
| 7,191,559 B1 * | 3/2007 | Laceky | ................. | A01K 87/06 43/21.2 |
| 8,813,416 B2 * | 8/2014 | Hudson | ................. | A01K 97/06 43/25.2 |
| 2005/0229472 A1 * | 10/2005 | Jost | ........................ | A01K 97/06 43/25.2 |
| 2008/0244956 A1 * | 10/2008 | Gant | ...................... | A01K 97/06 43/25.2 |
| 2011/0095894 A1 * | 4/2011 | Gibson | ............... | A01K 97/125 340/573.2 |
| 2020/0022347 A1 * | 1/2020 | Kusuda | ............. | A01K 89/0192 |

FOREIGN PATENT DOCUMENTS

JP        2014-236728 A    12/2014

* cited by examiner

*Primary Examiner* — Emmanuel M Marcelo
(74) *Attorney, Agent, or Firm* — Global IP Counselors, LLP (57) ABSTRACT

A dual-bearing reel includes a hook keeper having locking and support parts. The locking part has a hole and a slit. The slit extends from a first end surface to a second end surface of the locking part in a central axis direction. The support part supports the locking part, has a joining part including at least a portion of an annular ring, and is mounted on a mounting part at the joining part to be pivotable about a drive shaft. When the support part is positioned in a lateral direction of a handle, the hole and slit are on an outside of the handle in the lateral direction orthogonal to the drive shaft, and when the support part is positioned in a longitudinal direction of the handle, the hole and slit are on an inside of the handle in the lateral direction orthogonal to the drive shaft.

5 Claims, 7 Drawing Sheets

DUAL-BEARING REEL

CROSS-REFERENCE TO RELATED APPLICATIONS

This application claims priority to Japanese Patent Application No. 2018-136917, filed on Jul. 20, 2018. The entire disclosure of Japanese Patent Application No. 2018-136917 is hereby incorporated herein by reference.

FIELD OF THE INVENTION

The present invention relates to a dual-bearing reel.

BACKGROUND ART

During fishing, when the end of the fishing rod is moved or the fishing rod is changed, there are situations in which a fishing rod is carried around or set down with the tackle left attached to the fishing rod. In such cases, if a portion of the fishing line beyond the end of the rod is not fixed, this portion will move freely, and, depending on the tackle, the fishing hook may get caught in clothing, the reel body may become damaged, or the fishing line may become tangled. In order to prevent such occurrences, a hook keeper can be mounted on the fishing reel to lock the fishing hook. In general, in the hook keeper, a locking part for locking a fishing hook projects from the reel body, but the fishing line may become entangled in the projecting locking part when the hook keeper is not in use. Therefore, some conventional dual-bearing reels are equipped with a movable hook keeper. The dual-bearing reel disclosed in Japanese Published Unexamined Application No. 2014-236728, for example, is equipped with a hook keeper that can be stored as needed during use of a fishing rod by being able to turn from inside the reel body to the outside.

In the dual-bearing reel disclosed in Japanese Published Unexamined Application No. 2014-236728, since the hook keeper is capable of being housed inside the reel body, the structure of the reel body must be changed. In addition, the hook keeper disclosed in this application is for locking a fishing hook, but in the case of a down shot rig, since only the fishing hook is fixed, the sinker ahead is not fixed; thus, the problem of the reel body becoming damaged by the sinker or the fishing line becoming tangled is not solved.

SUMMARY

The present invention was made to solve the problem described above, and an object thereof is to provide a dual-bearing reel equipped with a movable hook keeper that, without changing the structure of the reel body, is capable of locking not only a fishing hook but also a sinker.

A dual-bearing reel according to a first aspect of the present invention is a dual-bearing reel for fishing, comprising a reel body, a spool supported by the reel body and around which fishing line is wound, a drive shaft rotatably supported by the reel body and constituting a winding mechanism for winding the fishing line around the spool, a handle having a mounting part mounted on one end of the drive shaft and that rotates the drive shaft, and a hook keeper having a locking part and a support part. A hole that penetrates the locking part and a slit that extends from the hole to the outside surface of the locking part and extends from one end surface to the other end surface of the locking part in the central axis direction of the hole are formed in the locking part. The support part supports the locking part, has a joining part that includes at least a portion of an annular ring, and is mounted on the mounting part at the joining part so as to be pivotable about the drive shaft. In a state in which the support part is positioned in a lateral direction of the handle, the hole and the slit of the locking part are on the outside of the outer surface of the handle in the lateral direction orthogonal to the drive shaft, and, in a state in which the support part is positioned in a longitudinal direction of the handle, the hole and the slit of the locking part are on the inside of the outer surface of the handle in the lateral direction orthogonal to the drive shaft.

Preferably, in the hook keeper, a line connecting the center of the slit at one end surface of the locking part in the central axis direction of the hole and the center of the slit at the other end surface is at a twisted position with respect to the central axis of the hole.

Preferably, the handle also has a handle arm that extends from the mounting part in a direction that intersects the drive shaft, and the hook keeper is attached on the outside of the handle arm in the axial direction of the drive shaft.

Preferably, the mounting part has a cylindrical portion for fixing the handle to the drive shaft, and an O-ring that is fitted and held in an annular groove formed in the outer circumferential surface of the cylindrical member, the support part has a joining part configured by an annular member that has an inner circumferential surface that opposes the outer circumferential surface of the cylindrical member and supports the locking part on the circumference of the annular member radially outwardly, and the O-ring is interposed between the inner circumferential surface of the annular member and the outer circumferential surface of the cylindrical member.

More preferably, the support part supports the locking part so as to be rotatable with respect to the support part about an axis that intersects the central axis of the hole.

With the present invention, it is possible to provide a dual-bearing reel equipped with a movable hook keeper that, without changing the structure of the reel body, is capable of locking not only the fishing hook but also the sinker.

DETAILED DESCRIPTION OF THE EMBODIMENTS

A dual-bearing reel according to an embodiment of the present invention will be described in detail below with reference to the drawings. In the figures, identical or equivalent parts have been assigned the same reference symbols.

First Embodiment

Figure 1:
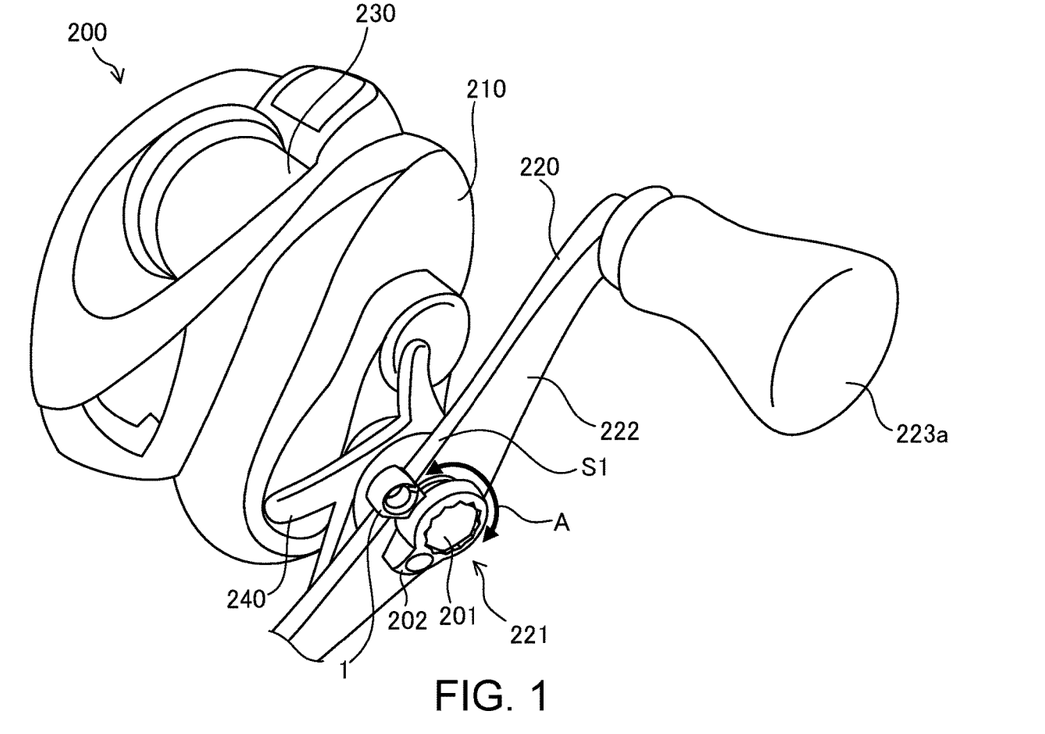
FIG. 1 is a perspective view of a dual-bearing reel according to a first embodiment of the present invention.

FIG. 1 is a perspective view of a dual-bearing reel according to the first embodiment of the present invention. The dual-bearing reel 200 is attached to a fishing rod so that the left front side in FIG. 1 is oriented toward the distal end (front) of the fishing rod. This dual-bearing reel 200 comprises a reel body 210, a handle 220 disposed on one side of the reel body 210, a spool 230 that is rotatably supported by the reel body 210, and a star drag 240 for drag adjustment disposed on the reel body 210 side of the handle 220.

The reel body 210 comprises a winding mechanism that rotates the spool 230 by receiving the rotation of the handle 220 to wind a fishing line around the spool 230. The handle 220 is mounted on one end of a drive shaft that is supported by the reel body 210 so as to be rotatable. The drive shaft is a member constituting the winding mechanism. The handle 220 has a mounting part 221 that is mounted on one end of the drive shaft, a handle arm 222 that extends from the mounting part 221 in a direction that intersects the drive shaft, and a pair of grips 223a (the second grip is not shown) mounted on a handle shaft, which extends from the distal end portion of the handle arm 222 parallel to the drive shaft and is rotatable.

The mounting part 221 includes a nut 201 for fixing the handle arm 222 to the drive shaft and a retainer 202 for retention of the nut 201 and fixing the nut 201 by tightening with a fixing screw. A hook keeper 1 has a locking part in which a hole and a slit are formed and a support part that supports the locking part and that has a joining part that includes a portion of an annular ring. The hook keeper 1 is mounted at the joining part so as to be capable of pivoting 180 degrees about the drive shaft (in the direction of arrow A in the figure).

When the hook keeper 1 is in use, the user brings the hole and the slit of the locking part of the hook keeper 1 into a state in which the hook keeper 1 is farther on the outside of outer surface S1 of the handle 220 in a lateral direction orthogonal to the drive shaft, as shown in FIG. 1. This state is referred to as the raised state of the hook keeper 1, and placement in this state is referred to as raising the hook keeper 1. When the hook keeper 1 is not in use, the user brings the hole and the slit of the locking part of the hook keeper 1 into a state in which the hook keeper 1 is farther on the inside of the outer surface S1 of the handle 220 in the lateral direction orthogonal to the drive shaft. This state is referred to as the lowered state of the hook keeper 1, and placement in this state is referred to as lowering the hook keeper 1.

When the hook keeper 1 is rotated 180 degrees about the drive shaft from the state shown in FIG. 1, the hole and the slit of the locking part of the hook keeper 1 are farther on the outside of outer surface S2 (see e.g., FIG. 5B), which is on the opposite side of the outer surface S1 of the handle 220 in the lateral direction orthogonal to the drive shaft. That is, the hook keeper 1 can be raised on either side of the lateral direction orthogonal to the drive shaft of the handle 220.

Figure 2:
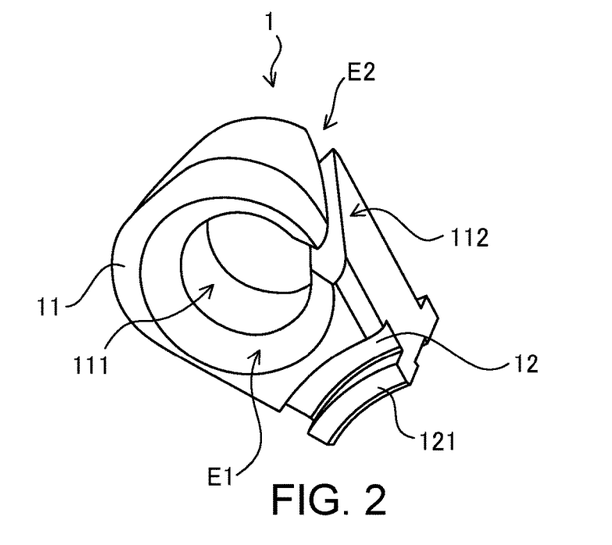
FIG. 2 is a perspective view of a hook keeper according to the first embodiment.

FIG. 2 is a perspective view of the hook keeper according to the first embodiment. The hook keeper 1 has a locking part 11 in which a hole 111 and a slit 112 are formed and a support part 12 that supports the locking part 11 and that has a joining part 121. The hole 111 penetrates the locking part 11. The slit 112 extends through from the hole 111 to an outside surface of the locking part 11 and extends from one end surface E1 to the other end surface E2 of the locking part 11 in the direction of the central axis of the hole 111. The joining part 121 has the shape obtained by cutting out a portion of an annular ring. The hook keeper 1 is mounted on the mounting part 221 of the handle 220 at the joining part 121 of the support part 12. The support part 12 supports the locking part 11 on the opposite side of the joining part 121.

When a fishing hook, including offset hooks, is locked to the hook keeper 1, a shank or a bend of the fishing hook is passed through the slit 112, pushed into the hole 111, and locked. The slit 112 is preferably wider than the thicknesses of the shank and the bend of the fishing hook, and the hole 111 preferably has a diameter that is larger than the width of the slit 112. When a fishing hook with an exposed hook point is locked, the hook point may be hooked on the locking part 11 at the periphery of the hole 111.

When a sinker is locked to the hook keeper 1, the fishing line is passed through the slit 112 and pushed into the hole 111. The hole 111 preferably has a smaller diameter than the width of the sinker, and the sinker is locked outside of the hole 111. At this time, if the diameter of the hole 111 is larger than the width of the eye of the sinker, only the eye of the sinker is housed inside the hole 111.

Figure 3:
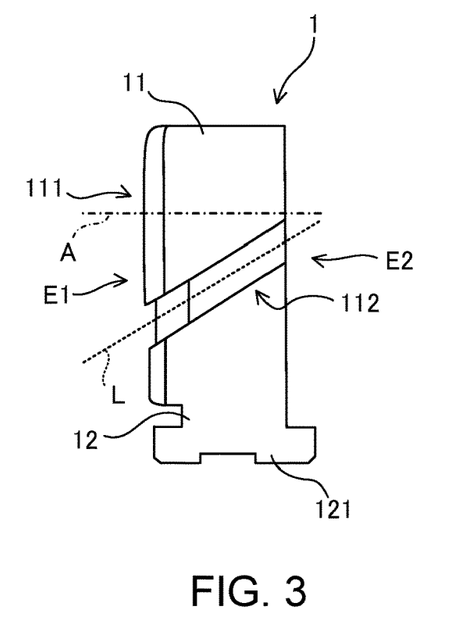
FIG. 3 is a side view of the hook keeper according to the first embodiment.

FIG. 3 is a side view of the hook keeper according to the first embodiment. In the hook keeper 1, a line L connecting the center of the slit 112 at one end surface E1 of the locking part 11 in the central axis direction of the hole 111 to the center of the slit 112 at the other end surface E2 is at a twisted position with respect to the central axis A of the hole 111. Forming the hole 111 and the slit 112 in this manner makes it less likely that the fishing hook or the sinker locked to the hook keeper 3 will become dislodged.

Figure 4:
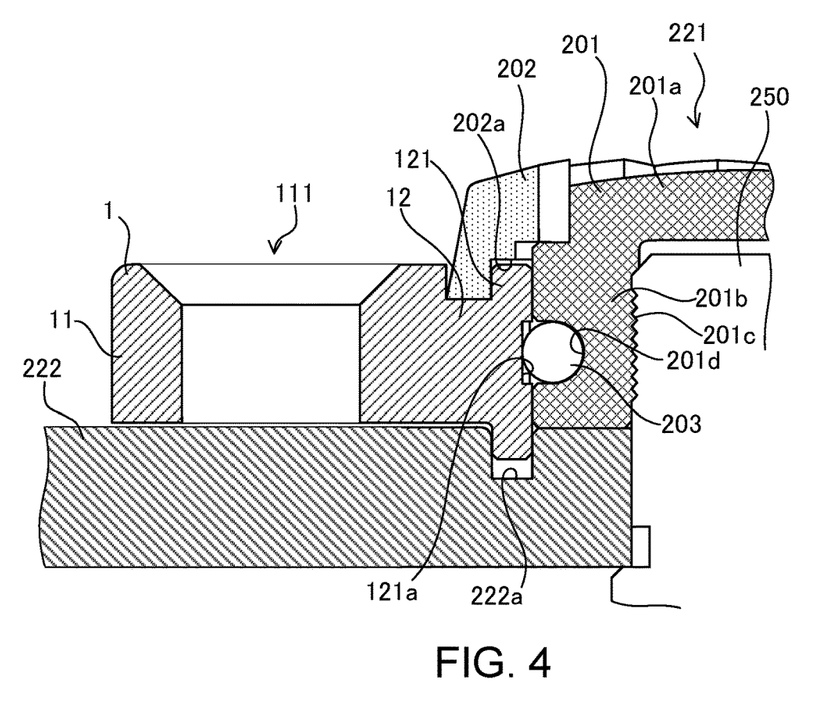
FIG. 4 is a cross-sectional view of a handle to which is attached the hook keeper according to the first embodiment.

FIG. 4 is a cross-sectional view of the handle, to which is attached the hook keeper according to the first embodiment. The cross-sectional view of FIG. 4 shows a portion of the cross section in the longitudinal direction of the handle 220 in the state in which the hook keeper 1 is lowered.

The mounting part 221 of the handle 220 includes the nut 201 for fixing the handle 220 to the drive shaft 250, and the retainer 202 that retains the nut 201. The nut 201 is a cylindrical member, whose upper portion 201a has the shape of a hexagonal column and fits in a hole of the retainer 202. A lower portion 201b thereof is cylindrical, having a female threaded portion 201c on the inner circumferential surface, and is screwed onto the drive shaft 250 by the female threaded portion 201c.

The joining part 121 of the support part 12 of the hook keeper 1 fits in a groove 222a formed on the handle arm 222 and in a groove 202a disposed between the outer circumferential surface of the lower portion 201b of the nut 201 and the inner circumferential surface of the retainer 202, which is not fitted to the upper portion 201a of the nut 201; the hook keeper 1 is thus mounted so as to be pivotable about the drive shaft 250.

A ring groove 201d is disposed on the outer circumferential surface of the lower portion 201b of the nut 201, and an O-ring 203 is held by being fitted in the ring groove 201d. A groove 121a is disposed on a surface on the nut 201 side of the joining part 121 of the support part 12 of the hook keeper 1, and a surface of the groove 121a that opposes the outer circumferential surface of the nut 201 contacts the O-ring 203. Since the hook keeper 1 does not move unless a certain amount of force is applied due to the friction with the O-ring 203, the hook keeper 1 will not be lowered when in use, and the hook keeper 1 will not be raised when not in use.

Figure 5A:
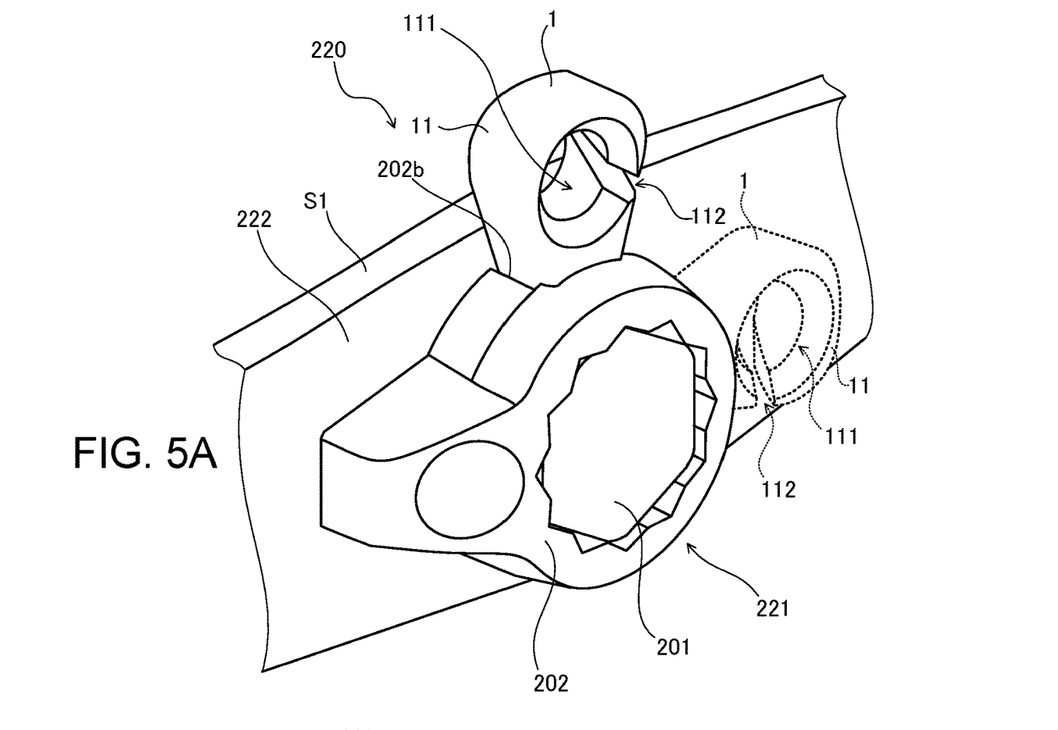
FIG. 5A is a perspective view of the handle illustrating the hook keeper according to the first embodiment in a raised state and a lowered state in one lateral direction orthogonal to the drive shaft of the handle.

FIG. 5A is a perspective view of the handle showing the hook keeper 1 according to the first embodiment in a raised state and a lowered state in one lateral direction orthogonal to the drive shaft of the handle. The hook keeper 1 is mounted so as to be capable of pivoting 180 degrees about the drive shaft. The retainer 202 has an abutting portion 202b. When the hook keeper 1 is rotated by the user in the direction to be raised on the abutting portion 202b side, the hook keeper 1 strikes the abutting portion 202b and easily stops the hook keeper 1 in the raised state. In a state in which the hook keeper 1 is raised on the abutting portion 202b side, the hole 111 and the slit 112 of the locking part 11 of the hook keeper 1 are farther on the outside of the outer surface S1 of the handle 220 in the lateral direction orthogonal to the drive shaft. In a state in which the hook keeper 1 is lowered (broken lines in the figure), the hole 111 and the slit 112 of the locking part 11 of the hook keeper 1 are farther on the inside of the outer surface S1 of the handle 220 in the lateral direction orthogonal to the drive shaft. The lowering of the hook keeper 1 by the user when the hook keeper 1 is not in use makes it possible to prevent the fishing line from becoming entangled with the hook keeper 1.

In the example of FIG. 5A, the outer surface S1 of the handle 220 in the lateral direction orthogonal to the drive shaft faces upward. In this embodiment, the hook keeper 1 is used by being raised by the user to the abutting portion 202b side. However, depending on the angle of the handle 220, there are cases in which the outer surface S2 faces upward. The case in which the outer surface S2 faces upward will be described with reference to FIG. 5B.

Figure 5B:
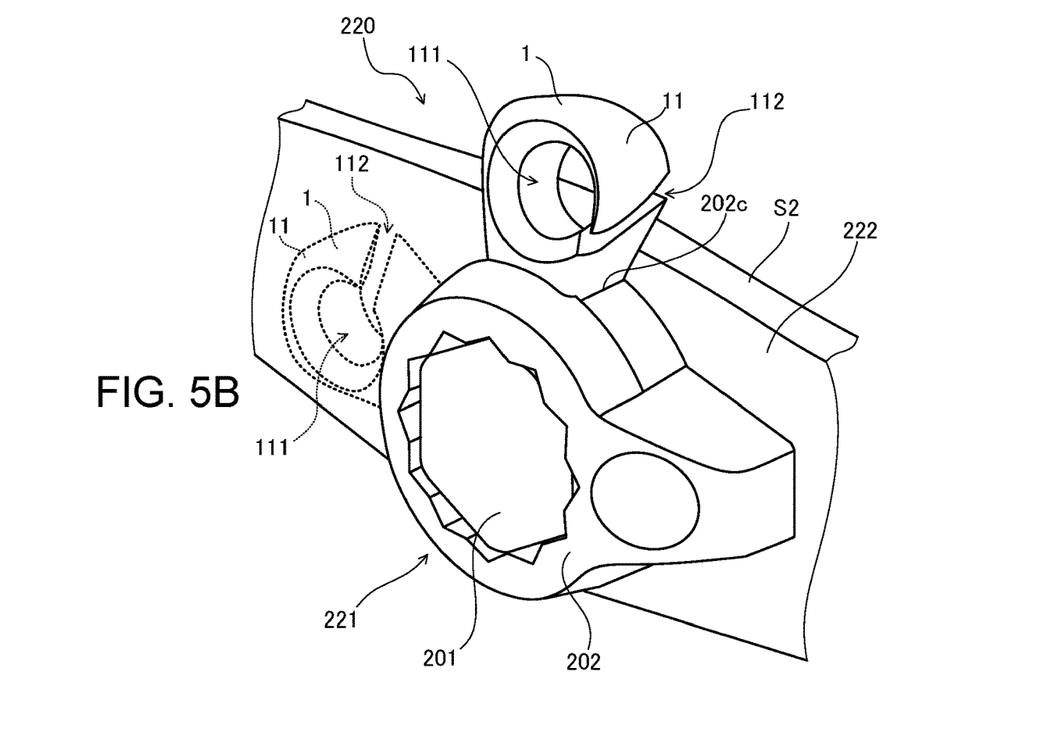
FIG. 5B is a perspective view of the handle illustrating the hook keeper according to the first embodiment in a raised state and a lowered state in the other lateral direction orthogonal to the drive shaft of the handle.

FIG. 5B is a perspective view of the handle showing the hook keeper according to the first embodiment in a raised state and a lowered state in the other lateral direction orthogonal to the drive shaft of the handle. The retainer 202 has an abutting portion 202c on the opposite side of the abutting portion 202b in the lateral direction orthogonal to the drive shaft of the handle 220. When the hook keeper 1 is rotated by the user in the direction to be raised to the abutting portion 202c side, the hook keeper 1 strikes the abutting portion 202c and easily stops the hook keeper 1 in the raised state. In a state in which the hook keeper 1 is raised to the abutting portion 202c side, the hole 111 and the slit 112 of the locking part 11 of the hook keeper 1 are farther on the outside of the outer surface S2 of the handle 220 in the lateral direction orthogonal to the drive shaft. In a state in which the hook keeper 1 is lowered (broken lines in the figure), the hole 111 and the slit 112 of the locking part 11 of the hook keeper 1 are farther on the inside of the outer surface S2 of the handle 220 in the lateral direction orthogonal to the drive shaft. That is, the hook keeper 1 can be raised on either side of the lateral direction orthogonal to the drive shaft of the handle 220. In addition, when the hook keeper 1 is in the lowered state, the hole 111 and the slit 112 do not come out from either outer surface of the handle 220 in the lateral direction orthogonal to the drive shaft.

As shown in FIG. 5A, the direction of tension on the fishing line when the fishing hook or the sinker is locked to the hook keeper 1 in a state in which the hook keeper 1 is raised to the abutting portion 202b side is the left front direction of FIG. 5A. On the other hand, as shown in FIG. 5B, the direction of the tension on the fishing line when the fishing hook or the sinker is locked to the hook keeper 1 in a state of being raised to the abutting portion 202c side is the left rear direction of FIG. 5B. In either situation, since the slit 112 of the locking part 11 of the hook keeper 1 is open in the direction opposite to the direction of tension on the fishing line, the shank or the bend of the fishing hook, or the fishing line, does not easily come out of the slit 112.

However, as shown in FIG. 5B, because the direction of tension on the fishing line is the direction in which the hook keeper 1 can be lowered, the friction force between the hook keeper 1 and the O-ring 203 shown in FIG. 4 is greater than the tension on the fishing line when the fishing hook or the sinker is hooked to the hook keeper 1. In addition, a groove can be disposed on the abutting portion 202c of the retainer 202, and a pawl of an elastic member can be disposed in a portion that is in contact with the groove of the abutting portion 202c of the hook keeper 1, so that when the hook keeper 1 is raised to the abutting portion 202c side, the groove of the abutting portion 202c and the pawl of the hook keeper 1 engage, and the hook keeper 1 is not lowered even when pulled by the fishing line. Alternatively, the hook keeper 1 may be mounted so as to be capable of pivoting 90 degrees about the drive shaft, and when the hook keeper 1 is used, the user can orient the outer surface S1 of the handle 220 upward and raise the hook keeper 1 to the abutting portion 202b side.

Figure 6:
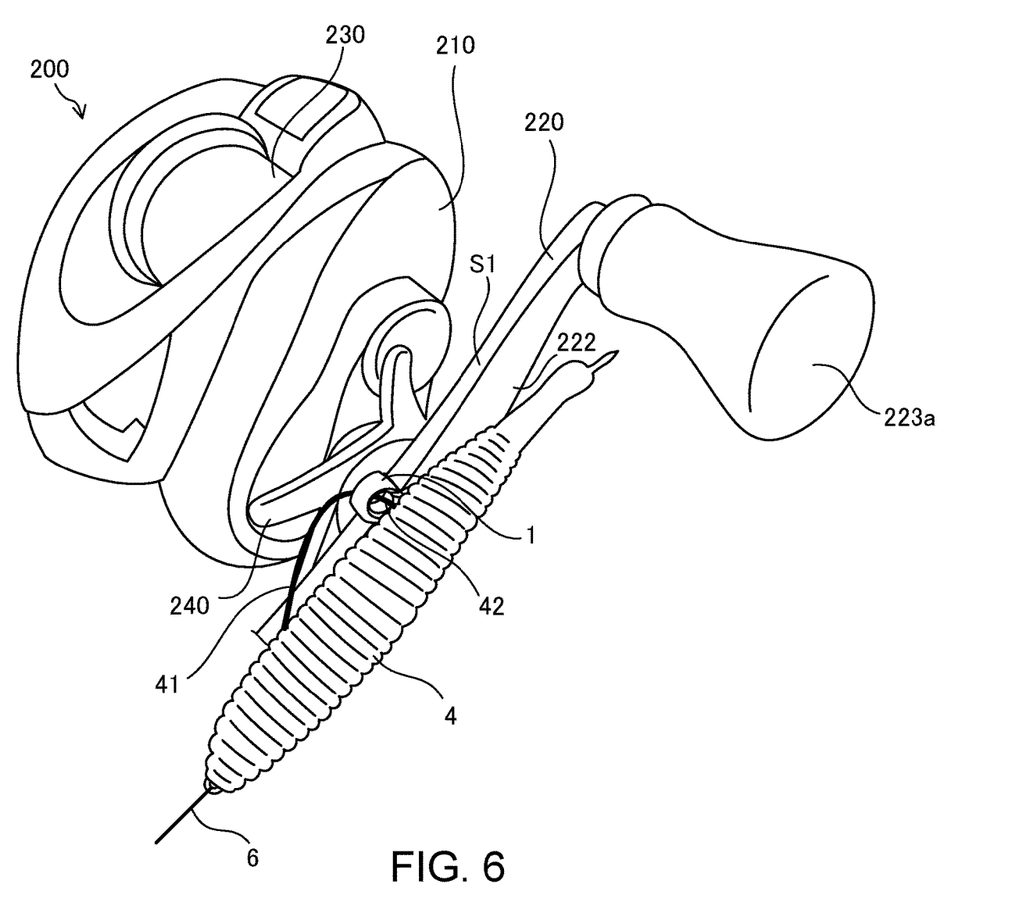
FIG. 6 is a perspective view of a fishing reel illustrating an example in which an offset hook is locked to the hook keeper according to the first embodiment.

FIG. 6 is a perspective view of the fishing reel illustrating an example in which an offset hook is locked to the hook keeper according to the first embodiment. When an offset hook 4 is locked to the hook keeper 1, the shank 41 or the bend 42 of the offset hook 4 attached to the tip of the fishing line 6 is passed through the slit of the hook keeper 1 and locked in the hole such that a worm follows along the handle arm 222. The slit of the hook keeper 1 is wider than the thicknesses of the shank 41 and the bend 42.

Figure 7:
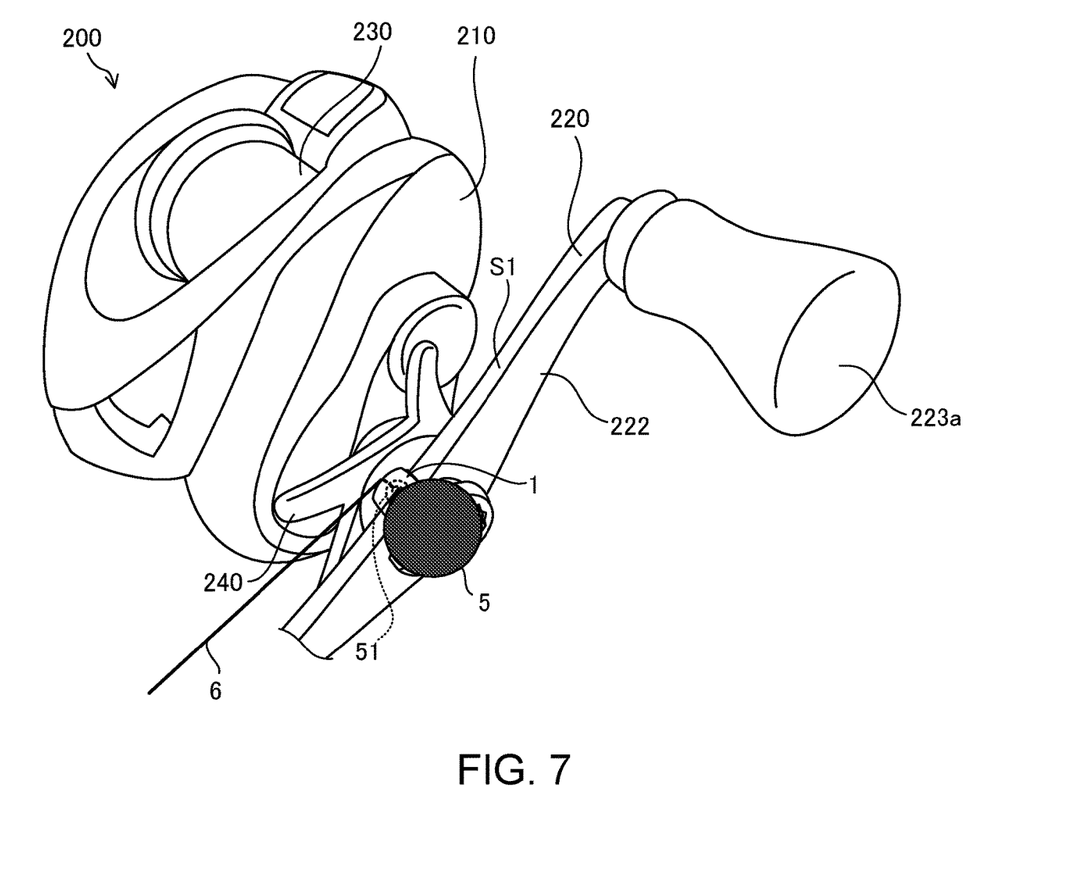
FIG. 7 is a perspective view of the fishing reel illustrating an example in which a sinker is locked to the hook keeper according to the first embodiment.

FIG. 7 is a perspective view of the fishing reel showing an example in which the sinker 5 is locked to the hook keeper according to the first embodiment. When the sinker 5 is locked to the hook keeper 1, the fishing line 6 passes through the slit of the hook keeper 1 and the sinker 5 is locked in the hole. In the example of FIG. 7, since the diameter of the hole of the hook keeper 1 is greater than the width of the eye 51 of the sinker 5, the sinker 5 is locked in a state in which only the eye 51 is housed inside the hole.

The hole of the hook keeper 1 described in FIGS. 1 and 4-7 is formed such that the central axis thereof is parallel to the axial direction of the drive shaft, but the direction of the central axis of the hole is not limited thereto; the central axis of the hole can be formed normally or obliquely to the axial direction of the drive shaft. In addition, the support part 12 of the hook keeper 1 may support the locking part 11 so as to be rotatable with respect to the support part 12 about an axis that intersects the central axis of the hole. It is thus possible to set an angle with which the user can easily pass the fishing hook or the fishing line through the slit. In addition, if the locking part 11 is rotated in the direction in which the fishing line is pulled in a state in which the fishing hook or the sinker is locked, the tension on the fishing line can be increased, so that the fishing hook or the sinker is less likely to come off.

Second Embodiment

Figure 8:
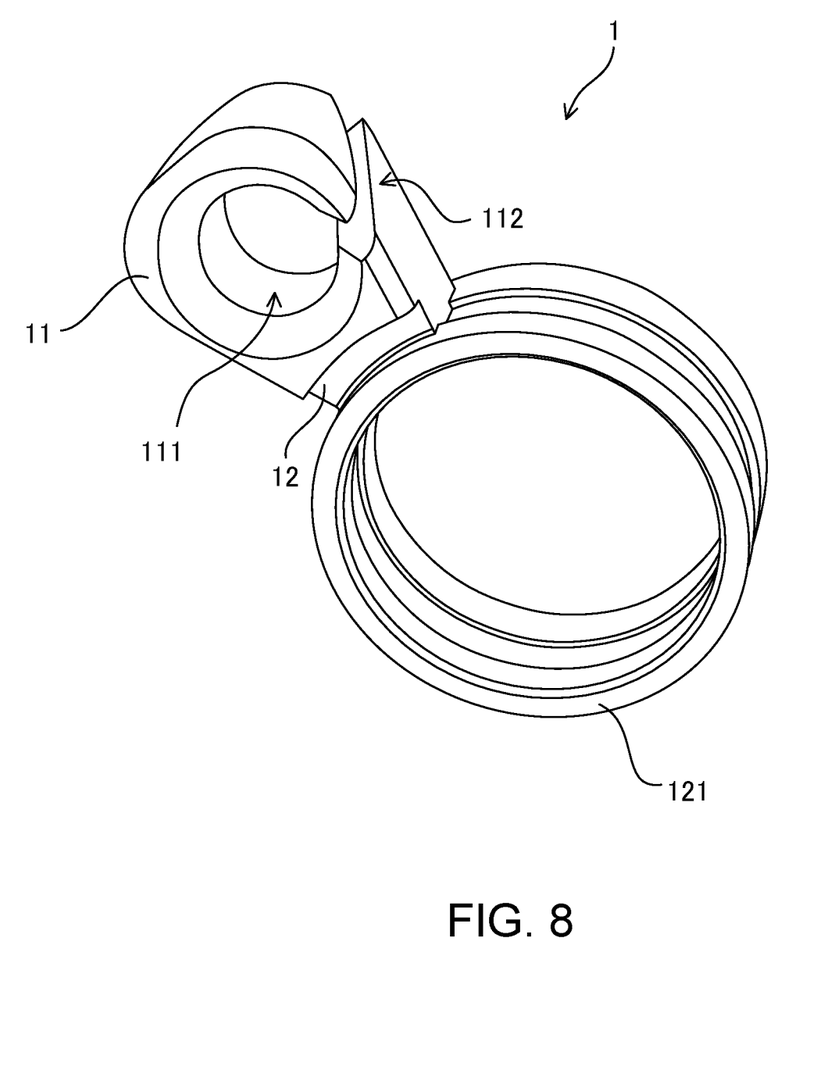
FIG. 8 is a perspective view of the hook keeper according to a second embodiment of the present invention.

FIG. 8 is a perspective view of the hook keeper according to a second embodiment of the present invention. The hook keeper 1 of the second embodiment differs from the hook keeper 1 according to the first embodiment mainly in terms of the shape of the joining part 121 of the support part 12.

The joining part 121 of the support part 12 is formed as an annular member, and the hook keeper 1 is mounted on the mounting part 221 of the handle 220 at the joining part 121. The support part 12 supports the locking part 11 on the circumference of the joining part 121 radially outwardly. The support part 12 may support the locking part 11 so as to be rotatable with respect to the support part 12 about an axis intersecting the central axis of the hole 111.

The cross-sectional view of the handle 220 to which is attached the hook keeper 1 according to the second embodiment is the same as in FIG. 4. The joining part 121 of the support part 12 of the hook keeper 1 fits in a groove 222a formed on the handle arm 222 and in a groove 202a formed between the outer circumferential surface of the lower portion 201b of the nut 201 and the inner circumferential surface of the retainer 202, which is not fitted to the upper portion 201a of the nut 201; the hook keeper 1 is thus mounted to be pivotable about the drive shaft 250.

A ring groove 201d is formed on the outer circumferential surface of the lower portion 201b of the nut 201, and an O-ring 203 is held by fitting in the ring groove 201d. The joining part 121 of the support part 12 of the hook keeper 1 has an inner circumferential surface that opposes the outer circumferential surface of the lower portion 201b of the nut 201. A groove 121a is formed on the inner circumferential surface of the joining part 121, and a surface of the groove 121a that opposes the outer circumferential surface of the nut 201 contacts the O-ring 203. That is, the O-ring 203 is interposed between the inner circumferential surface of the joining part 121 and the outer circumferential surface of the lower portion 201b of the nut 201. Since the hook keeper 1 does not move unless a certain amount of force is applied due to the friction with the O-ring 203, the hook keeper 1 will not be lowered when in use, and the hook keeper 1 will not be raised when not in use.

Figure 9A:
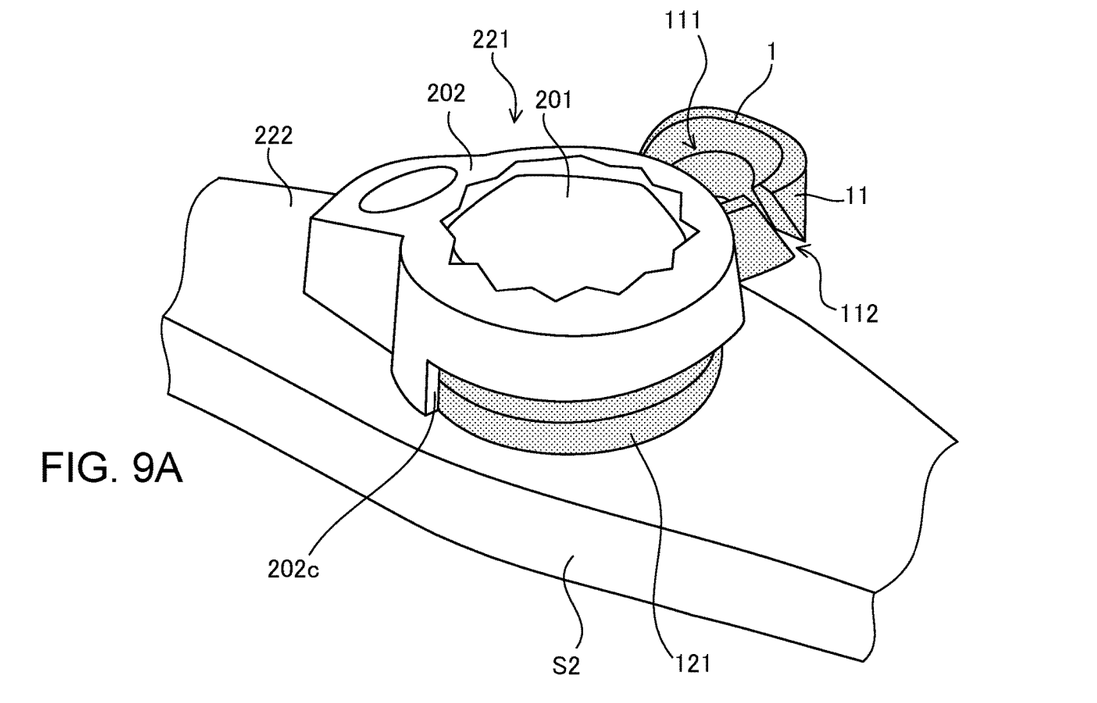
FIG. 9A is a perspective view of the handle show illustrating a state in which the hook keeper according to the second embodiment is raised.
Figure 9B:
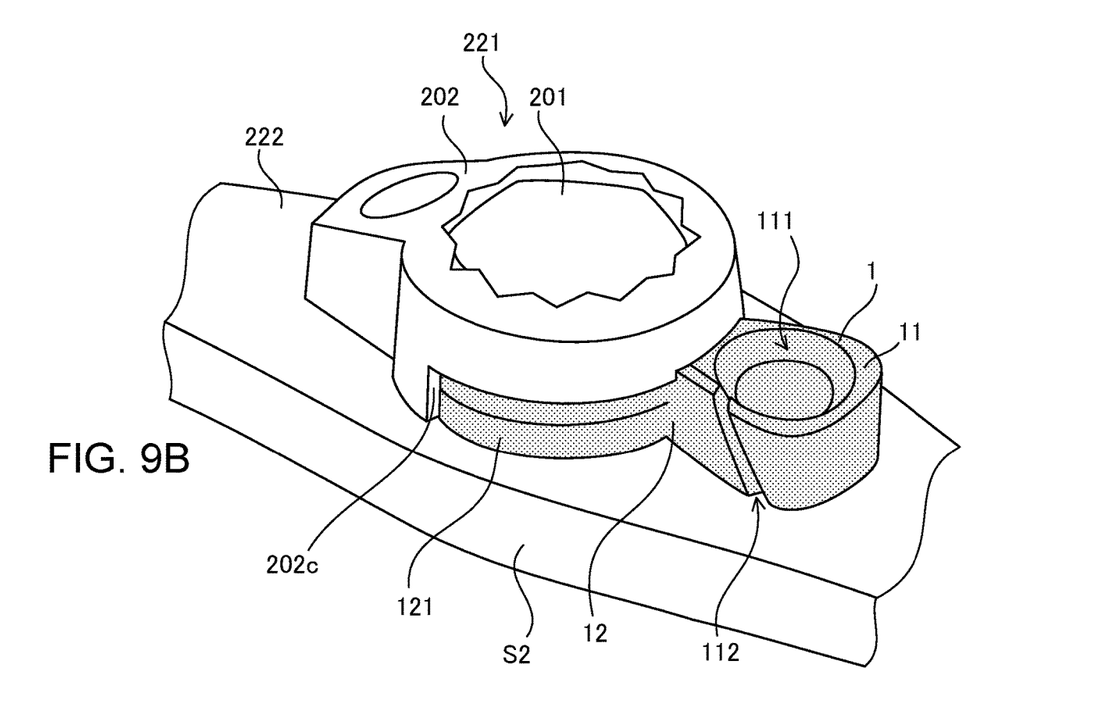
FIG. 9B is a perspective view of the handle illustrating a state in which the hook keeper according to the second embodiment is lowered.

FIG. 9A is a perspective view of the handle showing a state in which the hook keeper according to the second embodiment is raised. FIG. 9B is a perspective view of the handle showing a state in which the hook keeper according to the second embodiment is lowered. As shown in FIGS. 9A and 9B, because the joining part 121 is an annular member which covers the O-ring 203, even when the hook keeper 1 is raised or when the hook keeper 1 is lowered, the O-ring 203 is not exposed; thus, deterioration of the O-ring 203 can be suppressed.

In the embodiment described above, an example is described in which a fishing hook, including an offset hook, is locked to the hook keeper 1, but a lure with a hook and a short shank may also be locked to the hook keeper 1. In this embodiment, the fishing line is passed through the slit 112 and pushed into the hole 111. The hole 111 has a smaller diameter than the width of the lure, and the lure is locked outside of the hole 111. At this time, if the diameter of the hole 111 is larger than the width of the eye of the lure, only the eye of the lure is housed inside the hole 111.

The method shown in the embodiment described above in which a fishing hook, including an offset hook, is locked to the hook keeper 1 is only an example, and the user may arbitrarily choose the method of locking.

In the embodiment described above, the slit 112 of the locking part 11 of the hook keeper 1 is described as being wider than the thicknesses of the shank and the bend of the fishing hook; however, if the locking part 11 of the hook keeper 1 is an elastic member and the shank and the bend of the fishing hook can be passed through the slit 112 by pushing the shank and the bend of the fishing hook into the slit 112, the slit 112 can be narrower than the thicknesses of the shank and the bend of the fishing hook. In addition, in the embodiment described above, the slit 112 of the hook keeper 1 is disposed on a side surface of the hook keeper 1, but the embodiments are not limited thereto. For example, the slit 112 of the hook keeper 1 may be formed on a surface on the opposite side of the joining part 121.

What is claimed is:

1. A dual-bearing reel for fishing, comprising
   a reel body;
   a spool supported by the reel body and around which fishing line is capable of being wound;
   a drive shaft rotatably supported by the reel body, the drive shaft being a winding mechanism configured to wind the fishing line around the spool;
   a handle attached to one end of the drive shaft and configured to rotate the drive shaft; and
   a hook keeper having a locking part and a support part,
   the locking part having a hole penetrating therethrough and a slit extending from the hole to an outside surface of the locking part, the slit extending from a first end surface to a second end surface of the locking part in a central axis direction of the hole,
   the support part supporting the locking part, having a joining part including at least a portion of an annular ring, and mounted on a mounting part at the joining part so as to be pivotable about the drive shaft, and
   when the support part is positioned in a lateral direction of the handle, the hole and the slit of the locking part are on an outside of an outer surface of the handle in the lateral direction orthogonal to the drive shaft, and when the support part is positioned in a longitudinal direction of the handle, the hole and the slit of the locking part are on an inside of the outer surface of the handle in the lateral direction orthogonal to the drive shaft.

2. The dual-bearing reel according to claim 1, wherein in the hook keeper, a line connecting a center of the slit at the first end surface of the locking part in the central axis direction of the hole and the center of the slit at the second end surface is at a twisted position with respect to a central axis of the hole.

3. The dual-bearing reel according to claim 1, wherein the handle has a handle arm extending from the mounting part in a direction that intersects the drive shaft, and the hook keeper is attached to the outside of the handle arm in an axial direction of the drive shaft.

4. The dual-bearing reel according to claim 1, wherein the mounting part has
   a cylindrical member to fix the handle to the drive shaft, and
   an O-ring fitted and held in an annular groove on an outer circumferential surface of the cylindrical member,
   the joining part is formed by an annular member having an inner circumferential surface opposing the outer circumferential surface of the cylindrical member, and supporting the locking part on a circumference of the annular member radially outwardly, and
   the O-ring is interposed between the inner circumferential surface of the annular member and the outer circumferential surface of the cylindrical member.

5. The dual-bearing reel according to claim 1, wherein the support part supports the locking part so as to be rotatable with respect to the support part about an axis that intersects a central axis of the hole.

* * * * *